United States Patent
Wang et al.

(10) Patent No.: US 10,244,460 B2
(45) Date of Patent: Mar. 26, 2019

(54) ACCESS INFORMATION TABLE REGION FOR ACCESS TO CELLULAR NETWORKS

(71) Applicant: Telefonaktiebolaget LM Ericsson (publ), Stockholm (SE)

(72) Inventors: Jianfeng Wang, Beijing (CN); Gen Li, Beijing (CN); Qianxi Lu, Beijing (CN); Yanli Zheng, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/527,950

(22) PCT Filed: Feb. 3, 2016

(86) PCT No.: PCT/CN2016/073324
§ 371 (c)(1),
(2) Date: May 18, 2017

(87) PCT Pub. No.: WO2017/132878
PCT Pub. Date: Aug. 10, 2017

(65) Prior Publication Data
US 2018/0063772 A1 Mar. 1, 2018

(51) Int. Cl.
*H04W 4/00* (2018.01)
*H04W 48/12* (2009.01)
(Continued)

(52) U.S. Cl.
CPC .......... *H04W 48/12* (2013.01); *H04W 48/16* (2013.01); *H04W 72/0446* (2013.01); *H04L 1/1812* (2013.01)

(58) Field of Classification Search
CPC . H04W 48/12; H04W 48/16; H04W 72/0446; H04L 1/1812
See application file for complete search history.

(56) References Cited

U.S. PATENT DOCUMENTS

2011/0319110 A1* 12/2011 Futaki .................. H04W 24/02
455/507
2012/0195255 A1* 8/2012 Nylander .............. H04W 60/04
370/328
(Continued)

FOREIGN PATENT DOCUMENTS

CN 101212791 12/2006
CN 102118859 7/2011
WO WO-2013077783 A1 * 5/2013 .......... H04W 74/006

OTHER PUBLICATIONS

Frenger ("From always available to always optimized towards 5G-5Green systems design" Aug. 28, 2014, Ericsson) (Year: 2014).*
(Continued)

*Primary Examiner* — Maharishi V Khirodhar
(74) *Attorney, Agent, or Firm* — Baker Botts, LLP (57) ABSTRACT

The embodiments disclose a method for an access node of a region from a plurality of regions in a cellular network to control access to the cellular network, the method comprising generating an access information table (AIT); sending the AIT to a plurality of communication devices, sending a first signature sequence; and sending a second signature sequence. The embodiments also disclose a method for a communication device to access cellular network, the method comprising detecting one or more of first signature sequences; selecting a first signature sequence; determining a region according to the selected first signature sequence; selecting an AIT, detecting a second signature sequence; determining an entry of the selected AIT according to the detected second signature sequence; and accessing the cellular network. The access node and communication device thereof are also disclosed according to the embodiments.

8 Claims, 7 Drawing Sheets

(51) Int. Cl.
  *H04W 48/16*    (2009.01)
  *H04W 72/04*    (2009.01)
  *H04L 1/18*     (2006.01)

(56) References Cited

U.S. PATENT DOCUMENTS

2014/0295836 A1    10/2014  Frenger et al.
2017/0006613 A1*   1/2017   Kakishima ............ H04W 76/14

OTHER PUBLICATIONS

Frenger ( A clean slate radio network designed for maximum energy performance, 2014) (Year: 2014).*

Pal (IEEE, A clean slate radio network designed for maximum energy Performance, conference: Sep. 2-5, 2014 published on Jun. 29, 2015) (Year: 2014).*

PCT Notification of Transmittal of the International Search Report and the Written Opinion of the International Searching Authority, or the Declaration for International application No. PCT/CN2016/073324—dated Sep. 26, 2016.

From Always Available to Always Optimized; Towards 5G-5green System Design; Summer School; Dr. Pal Frenger, Ericsson Research—dated Aug. 27, 2014.

* cited by examiner

| GLOBLE TIME | |
| --- | --- |
| PLMN LIST | |
| INDICATOR | |
| IDENTIFIER 1 | ACCESS CONFIGURATION 1 |
| IDENTIFIER 2 | ACCESS CONFIGURATION 2 |
| ... | ... |

ACCESS INFORMATION TABLE REGION FOR ACCESS TO CELLULAR NETWORKS

PRIORITY

This non-provisional application is a U.S. National Stage Filing under 35 U.S.C. § 371 of International Patent Application Serial No. PCT/CN2016/073324 filed Feb. 3, 2016, and entitled "Access Information Table Region For Access To Cellular Networks."

TECHNICAL FIELD

The present disclosure generally relates to methods for accessing to cellular networks and access nodes and communication devices thereof.

BACKGROUND

To increase transmission efficiency and fully enable utilize high gain beam-forming or other multi-antenna techniques in the fifth generation (5G) cellular networks, a concept of access information table (AIT) was introduced. In this concept, user equipments (UEs) are provided with access information by using AIT and a system signature sequence (SSS) in a broadcast transmission, where each SSS may be used to indicate information from the broadcasted AIT. The AIT may for example define settings relating to how a UE shall access the networks, e.g., by a random access procedure, handover procedure or reselection procedure, concerning how the UE can be reached by the system in a paging procedure, or concerning more advanced settings, such as related to beam-forming, link adaptation or Hybrid Automatic Repeat Request (HARQ).

To reduce network energy consumption, the AITs are typically transmitted with long periodicity, e.g. from 1.024 s up to 10.24 s, while the SSSs are typically transmitted more frequently, e.g. every 100 ms. Typically each access node, e.g., a base station (BS) in a homogeneous network, a macro-node for a macro cell or a pico-node for a small cell in a heterogeneous network, will transmit SSS which allows the UE to identify the information applicable to this access node from the AIT. However, the AITs do not need to be transmitted by every access node. For example, an access node, such as a macro-node serving a macro cell may transmit both an AIT and SSS, while an access node, such as a pico-node serving a small cell within a coverage region of the macro cell may transmit only SSS.

Generally, the AIT is designed to include all possible parameter combinations of all access nodes to support all possible access configurations and system information. Thus, the payload or capacity of the AIT would be very large to include such much possibility of the parameter combination, i.e., a large number of entries should be included in the AIT, which would challenge the receiving and detection for communication devices. Therefore, the effort to detect SSS from a very large of candidates could be much time and power-consuming for a communication device, before it accessing the network, resulting high energy consumption.

SUMMARY

In this disclosure, an AIT is associated with a region from a plurality of regions in a cellular network, and access nodes in the region have common access configurations and basic system information. An identifier indicating the entries in the AIT of this region are internally decided by the region itself. The parameters indicated by the entries are related to the access control, such as random access, paging, handover, and reselection procedures, and advanced settings, such as beam-forming, link adaptation and HARQ. On the other hand, to facilitate the region updating and detection, a signal to indicate the AIT region is further defined and periodically transmitted in the corresponding region in a form of special reference signals in the physical layer, i.e., a first signature sequence. Furthermore, the identifier indicating the entry of the AIT is mapped to a second signature sequence, which is transmitted in the physical layer by an access node from a plurality of access nodes in the region. It should be noted that the AIT could comprise a plurality of entries; each entry could represent an access configuration, which could comprise a plurality of access control and data transmission related parameters for an access node. Since the number of access nodes in one region is much smaller than the one of all the access nodes in the cellular network, the AIT payload, i.e., the number of entries in the AIT could be reduced, facilitating random access and/or data transmission for communication devices. Therefore, the communication devices detect the first signature sequences to select a region and read the corresponding AIT, and detect the second signature sequence to map to the identifier and obtain the corresponding entry and resulting parameters in the AIT.

According to one aspect of the embodiments, there is provided a method for an access node of a region from a plurality of regions in a cellular network to control access to the cellular network, the method comprising: generating an AIT; sending the AIT to a plurality of communication devices, wherein the AIT is associated with the region to which the access node belongs, and the AIT comprises an indicator and a group of entries, the indicator indicating the AIT of the region, and each entry of the group indicating one or more parameters for controlling access of communication devices to the cellular network. Additionally, the method further comprises: sending a first signature sequence; and sending a second signature sequence, wherein the first signature sequence is further mapped to the indicator and the second signature sequence is associated with the access node and is further mapped to an identifier indicating an entry of the AIT. The region from the plurality of region, comprising coverage of a plurality of access nodes, is determined by neighbouring relationship and/or deployment scenario of access nodes in the cellular network. The parameters for controlling access to the cellular network indicated by the entries of the group in the AIT relates to one or more of random access configuration, paging configuration, handover configuration and/or reselection configuration. Furthermore, The parameters for controlling access to the cellular network indicated by the entries of the group in the AIT relates to one or more of beam-forming configuration, link adaptation configuration and/or HARQ configuration.

According to a further aspect of the embodiments, there is provided an access node in a cellular network, the access node comprising: an AIT generation module for generating an AIT and an AIT transmission module for sending the AIT to a plurality of communication devices. Furthermore, the access node comprises a first signature sequence transmission module for sending a first signature sequence and a second signature sequence transmission module for sending a second signature sequence.

According to a further aspect of the embodiments, there is provided a computer readable storage medium, which store instructions which, when run on an access node, cause the access node to perform the steps of the methods as described above.

According to a further aspect of the embodiments, there is provided an access node in a cellular network, the access node comprising: a first interface being utilized to interact with communication devices; a second interface being utilized to interact with a core network; a memory storing data and instructions therein; and a processing system, being configured to perform the steps of the methods as described above.

According to a further aspect of the embodiments, there is provided a method for a communication device to access a cellular network, the cellular network comprising a plurality of regions, the method comprising: detecting one or more of first signature sequences; selecting a first signature sequence based on a region selection criterion; determining a region according to the selected first signature sequence; and selecting an AIT associated with the determined region from a plurality of AITs, wherein the plurality of AITs are received and/or stored by the communication device. Additionally, the method further comprises detecting a second signature sequence; determining an entry of the selected AIT according to the detected second signature sequence; and accessing the cellular network based on one or more parameters in the entry of the selected AIT, wherein the second signature sequence is sent by an access node of the cellular network.

According to a further aspect of the embodiments, there is provided a communication device, comprising: a first signature sequence detection module for detecting one or more of first signature sequences; a first signature sequence selection module for selecting a first signature sequence based on a region selection criterion; a region determination module for determining a region according to the selected first signature sequence; and an AIT selection module for selecting an AIT associated with the determined region from a plurality of AITs, Additionally, the communication device further comprises a second signature sequence detection module for detecting a second signature sequence; an entry determination module for determining an entry of the selected AIT according to the detected second signature sequence; and an access module for accessing the cellular network based on one or more parameters in the entry of the selected AIT.

According to a further aspect of the embodiments, there is provided a computer readable storage medium, which store instructions which, when run on a communication device, cause the access node to perform the steps of the methods as described above.

According to a further aspect of the embodiments, there is provided a communication device, which comprises a first interface for accessing a cellular network; a memory storing data and instructions therein; and a processing system, being configured to perform the steps of the methods as described above.

Details of the above embodiments and further embodiments will be apparent from the following detailed description of embodiments.

BRIEF DESCRIPTION OF THE DRAWINGS

The disclosure will now be described, by way of example, based on embodiments with reference to the accompanying drawings, wherein.

DETAILED DESCRIPTION OF EMBODIMENTS

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meanings as commonly understood. It will be further understood that a term used herein should be interpreted as having a meaning consistent with its meaning in the context of this specification and the relevant art and will not be interpreted in an idealized or overly formal sense unless expressly so defined herein.

The present technology is described below with reference to block diagrams and/or flowchart illustrations of methods, nodes, devices (systems) and/or computer program products according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology may be embodied in hardware and/or in software (including firmware, resident software, micro-code, etc.). Furthermore, the present technology may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that may contain, store, communicate, propagate, or transport the program for use by or in connection with the instruction execution system, apparatus, or device.

Figure 1:
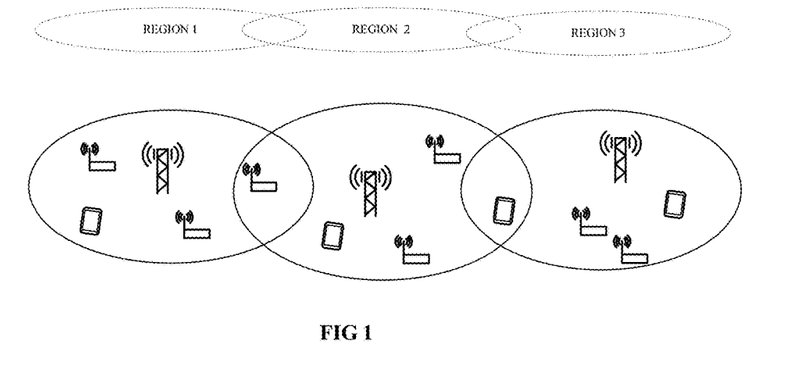
FIG. 1 schematically illustrates an example of region determination in a cellular network in which access control is implemented according to an embodiment of the disclosure.

FIG. 1 schematically illustrates an example of region determination in a cellular network in which access control is implemented according to an embodiment of the disclosure. As discussed above, the coverage of a cellular network comprises a plurality of regions, e.g. only for illustrative purpose, three regions, REGION 1, REGION 2 and REGION 3 in FIG. 1. There is a plurality of access nodes in each region, which could be macro-node for macro cell coverage or pico-node for small cell coverage in heterogeneous networking scenarios. In this Figure, the region to share a same AIT is determined by neighboring relationship of access nodes in the cellular network. Generally, the access nodes with a neighboring relationship will be determined as in one region. For example, in 3rd Generation Partnership Project (3GPP) Long Term Evolution (LTE) cellular networks, the region determination could be performed in the network planning phase and the access nodes with a neighborhood relationship could be determined as in one region, and one access node in overlapped area could be determined as in more than one region. It should be also mentioned that the region determination based on the neighboring relationship could be updated as the neighborhood relationship of the access nodes changes. As the number of access nodes in one region is much smaller than the one of all the access nodes in the cellular network, the AIT payload, i.e., the number of entries in the AIT could be reduced. An identifier to indicate the entry in an AIT of a region is unique and only depends on the region itself, that is, a same entry in different AITs of different regions may be indicated by different identifiers, resulting in a more flexible AIT configuration. The region can be decided by the diversity of the basic system information and random access configurations among the nodes in the coverage of the region.

In this determination approach, there may exist macro-nodes and pico-nodes in the coverage of the cellular network, and the pico-nodes are used for the data boost and macro-nodes are used for the wide coverage. For example, the macro-nodes can distribute the AIT, which includes the information of pico-nodes in the overlapped area. In this case, communication devices in the area can receive the AIT from the macro-nodes, and boost data transmission from the pico-nodes, which would not send the AIT instead.

Figure 2:
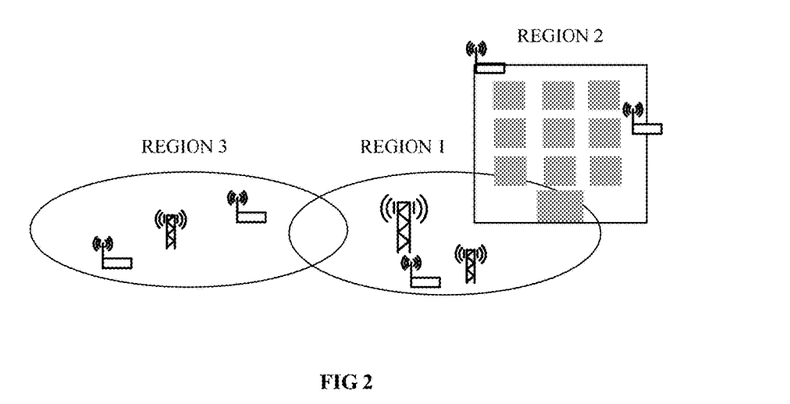
FIG. 2 schematically illustrates another example of region determination in a cellular network in which access control is implemented according to an embodiment of the disclosure.

FIG. 2 schematically illustrates another example of region determination in a cellular network in which access control is implemented according to an embodiment of the disclosure. As illustrated in FIG. 2, the regions, such as REGION 1, REGION 2 and REGION 3, can be determined by the deployment scenario. Because the random access configurations and related system information to be configured are much related with the deployment scenarios, such as indoor coverage, high speed and rural area, an AIT can be generated for the dedicated scenario, which can be shared by the access nodes to support such scenario. For example, in rural area with small number of communication devices, the number of random access configurations can be much less than that in the urban area with large number of communication devices. In the indoor coverage application scenario, the access nodes in the corresponding region mainly serve as providing the high-throughput communication capacity for the communication devices, therefore, the number of beam-forming or link adaption configurations in this scenario can be much more than that in rural area. In the high speed scenario, the communication devices could handover much more frequently among different access nodes; therefore the number of random access and handover configuration could be much more than that of indoor application scenario. It is noted that in this case the access nodes in the region could be physically isolated.

It should mentioned that both approaches as aforementioned are aimed to determine the region, and the general object is to include as many access nodes which have the same or similar random access configurations, paging configuration, handover configuration, reselection configuration, beam-forming configuration, link adaption configuration, and/or HARQ configuration as possible into one region, so that the number of entries to indicate the configuration parameters can be as small as possible, i.e., the payload of the AIT associated with the region could be as small as possible, facilitating communication devices detecting signature sequences in physical layer and accessing to the cellular network. After determining the region, the random access related system information and configurations of all access nodes in this region are inserted into the AIT. Each entry of the AIT is indicated by a unique number in this region, i.e., the identifier.

Figure 3:
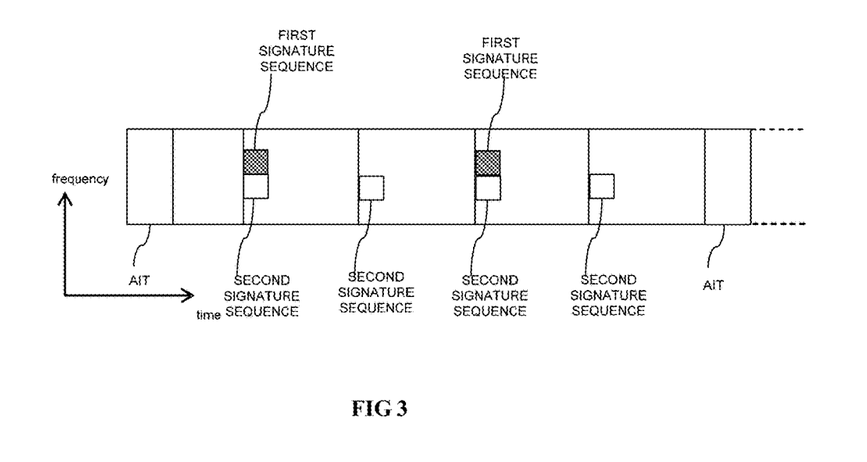
FIG. 3 schematically illustrates transmission of AIT, a first signature sequence and a second signature sequence according to an embodiment of the disclosure.

FIG. 3 schematically illustrates transmission of AIT, a first signature sequence and a second signature sequence in the time (t) and frequency (f) domain according to an embodiment of the disclosure. For a region in a heterogeneous cellular network, for example, the macro-node serving as providing coverage for communication devices could send the AIT and the first signature sequence either in a broadcast transmission or in a multicast transmission, while the pico-node serving as providing data communication throughput for communication devices may only send the second signature sequence in the physical layer to indicate which entry in the AIT is associated with this access node. As aforementioned, the AIT comprises the entries indicating different access and transmission parameter combinations for different access nodes, and the first signature sequence sent in the physical layer serves as a signal, which could be detected by the communication devices to determine which AIT could be used in this region. The second signature sequence is used to indicate a specific entry associated with a macro-node or pico-node, and in the random access procedure the communication devices will detect the second signature sequence in the physical layer and map it to a specific entry, obtaining parameters for accessing to the macro-node or the pico-node.

It should be also mentioned that since content of AIT is relatively constant for a certain time period, the AIT for a region could be stored in a communication device in a coverage of the region after the first successful AIT reception, which means that the communication device do not necessarily receive the AIT from the physical layer, avoiding extra time and power consumption.

As illustrated, the first signature sequence and the second signature sequence are transmitted more frequently than the AITs. For example, a relatively long periodicity, e.g., from 1.024 s up to 10.24 s, may be utilized for transmission of the AITs, while a shorter periodicity, e.g., of about 100 ins, may be utilized for transmission of the first signature sequence and the second signature sequence. It should be noted that both periodicities may be longer than a granularity of resource allocation in the time domain, which may for example be based on time slots in the order of 1 ms. Furthermore, It will be apparent for the person skilled in the art to implement different time and frequency transmission configuration for the AIT, the first signature sequence and the second signature sequence, after reading the disclosure and the appended drawing. Any alteration, modification and variant for the time and frequency configuration for the transmission of the aforementioned AIT, the first signature sequence and the second signature sequence, should fall within the scope of our claims. Moreover, it should be mentioned that the transmission of the AIT, the first signature sequence and the second signature sequence could be broadcast, multicast or unicast according to different application scenarios and network configurations. Typically, the transmission of AIT, the first signature sequence and the second signature sequence is periodic; however, the non-periodic transmission is also applicable for certain application scenarios.

Figure 4:
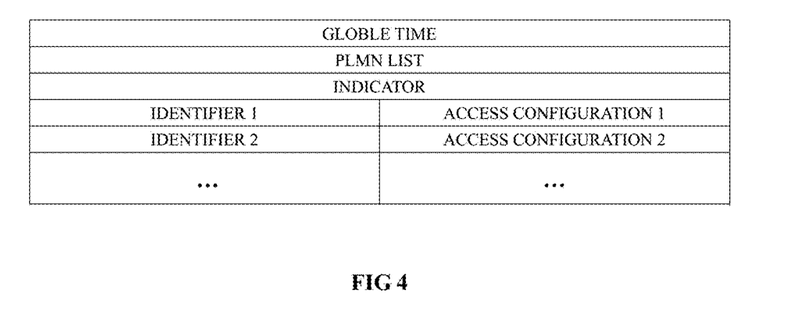
FIG. 4 schematically illustrates a structure of AIT according to an embodiment of the disclosure.

FIG. 4 schematically illustrates a structure of AIT according to an embodiment of the disclosure. For example, the structure of AIT may comprise global time, PLMN list, bandwidth or frequency information, different timers and other control parameters for random access process and data transmission process. More specifically, as shown in FIG. 4, a dedicated indicator is defined and associated with the AIT of a specific region, which is used to identify the region by communication devices. It should he noted that the number of the indicator is decided by the number regions to he supported in the network. Moreover, an identifier is defined to indicate an entry in the AIT, which represents an access configuration as illustrated in FIG. 4. It should he mentioned that typically different access nodes, i.e., macro-nodes or pico-nodes, corresponds to different identifiers and resulting different random access configuration configurations, while several access nodes with the same random access configuration could correspond to the same identifier. The identifier and random access configuration for different access nodes are flexible to support different networking and application scenarios.

The indicator could be further mapped to the first signature sequence in the physical layer, while the identifier could be further mapped to the second signature sequence in the physical layer. As discussed above, the communication devices in the region could detect the first and the second signature sequence to map to the indicator and identifier respectively, and then obtaining the access parameters and accessing to the cellular network.

Figure 5:
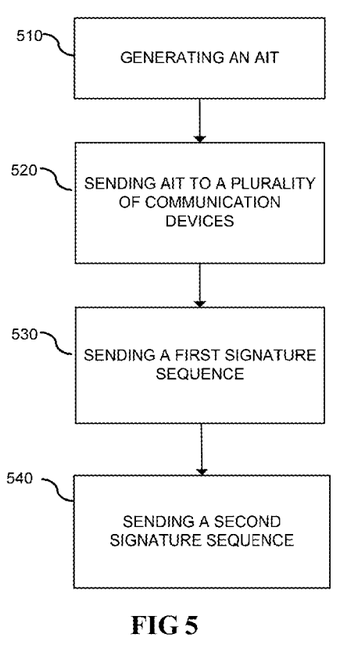
FIG. 5 shows a flowchart for illustrating a method of controlling the access to a cellular network according to an embodiment of the disclosure.

FIG. 5 shows a flowchart for illustrating a method of controlling access to a cellular network according to an embodiment of the disclosure. The method may be performed by an access node of the cellular network, e.g., by a BS in a homogeneous network, a macro-node in a heterogeneous network, which is responsible for providing access of communication devices to the cellular network, or a pico-node in a heterogeneous network, which is responsible of providing data communication throughput for the communication devices. If a processor-based implementation of the access node is used, the steps of the method may be performed by one or more processors of the access node. The communication devices may correspond to UEs, such as mobile, smart phone, tablet and notebook etc. However, the communication device could also correspond to other kinds of communication devices, such as relay nodes or devices having only modem functionality.

At step 510, an access node in a region from a plurality of regions in the cellular network generates an AIT. It should be mentioned that the AIT for example may be generated in a centralized or a distributed way. More specifically, for the centralized way, the AIT associated with the region may be generated by one or more specific access nodes from all the access nodes in the region or a centralized management node in the region, and then be forward to the other access nodes, while for the distributed way, the AIT may be generated and updated by different access nodes. As discussed above, the AIT may for example comprise system information, such as the global time, PLMN list, bandwidth or frequency information, and possible access configurations such as different timers and control parameters for random access process and other information items related to the access control and data transmission process, which could be determined and used by the communication devices in the region to access to the cellular network or perform data transmission.

At step 520, the access node sends the AIT to a plurality of communication devices in the cellular network. The sending of the AIT could be a broadcast transmission, a multicast transmission or a unicast transmission.

It should be noted that for certain application scenarios, some communication devices may only aim to receive and store an AIT, and it is not necessary for those communication devices to further determine a specific entry in the AIT, as said communication devices would only update a new version of the AIT after a certain time and obtain some basic system information, such as global time, PLMN or system bandwidth and frequency information. It should also be noted that although all the access nodes could send the AIT in the region of a heterogeneous network, only macro-nodes may send the AIT for the purpose of energy and resource saving for pico-nodes, which may not send AIT according to different networking configuration and application scenarios.

At step 530, additionally, the access node sends a first signature sequence in the physical layer to plurality of communication devices in the cellular network. The first signature sequence is mapped to an indicator indicating the AIT of the region in the cellular network. Typically, the first signature sequence is sent periodically. Without departing from the spirit and scope of this disclosure, the time and frequency configuration for the transmission of the first signature sequence can be preset or updated according to specific networking and application scenarios.

At step 540, the access node sends a second signature sequence in the physical layer to plurality of communication devices in the cellular network. The second signature sequence is mapped to an identifier of the AIT, which indicates an entry of the AIT. The parameters indicated by the entry of the AIT are used by communication devices to perform access control, such as random access, handover, reselection and paging or perform data transmission, such as beam-forming, link adaption and HARQ.

Figure 6:
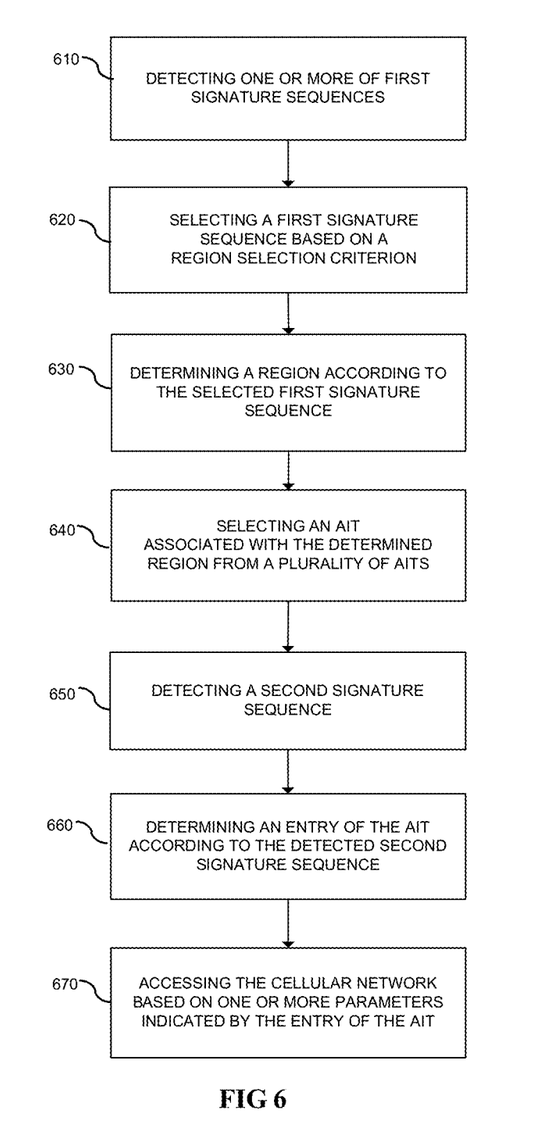
FIG. 6 shows a flowchart for illustrating a method of accessing to a cellular network according to an embodiment of the disclosure.

FIG. 6 shows a flowchart for illustrating a method of accessing to a cellular network according to an embodiment of the disclosure. The method may be performed by a communication device in a cellular network. The communication devices may correspond to UEs, such as to mobile, smart phone, tablet and notebook etc. However, the communication device could also correspond to other kinds of communication devices, such as relay nodes or devices having only modem functionality. If a processor-based implementation of the communication device is used, the steps of the method may be performed by one or more processors of the communication device.

At step 610, a communication device detects one or more of the first signature sequences. Since the communication device may located in the overlapping area of two or more regions, it may detect more than one first signature sequence with different received signal level or signal quality such as signal to interference and noise ratio (SINR), or signal noise ratio (SNR), indicating the different distance from the communication device to different access nodes sending the AITs and the first signature sequences in physical layer in different regions in the cellular network.

At step 620, the communication device selects the first signature sequence based on a region selection criterion. As aforementioned, the selection criterion could be based on the received signal level or the received signal quality such as SINR or SNR. For example, the communication device selects the first signature sequence that best fits the above selection criterion.

At step 630, the communication device determines the region according to the selected first signature sequence. Based on the determined region, the communication device selects an AIT from a plurality of AITs, at step 640. It should be mentioned the plurality of AITs could be received in current communication or they may have been received and/or stored by the communication device in previous communication. Since the content of the plurality of AITs is relatively constant in a certain time period and the communication device does not need to receive the plurality of AITs from physical layer frequently, instead, they can receive the plurality of AITs for the first time, and then store the plurality of AITs for further usage. Besides, if there is no AIT corresponding to the first signature sequence, the communication device would further wait and decode the AIT transmission in the region.

As aforementioned, for certain application scenarios in which for example a communication device would like to receive basic network information when the communication device is first powered on, only the basic information in the AIT of the region, such as the bandwidth and the frequency available for the region, is required for the communication device, therefore, it is not necessary for the communication device to further obtain the access control or data transmission related parameters, while in some other application scenarios, the communication devices have to further obtain these parameters to perform random access or data transmission with beam-forming, link adaption or HARQ.

At step 650, the communication device detects a second signature sequence. The second signature sequence is associated with an access node in the region. Since the second signature is mapped to an identifier indicating an entry of the AIT, the communication device determines the entry of the AIT according to the detected second signature sequence at step 660, thereby obtaining the parameters related to the access control and the data transmission configuration with the specific access node.

At step 670, the communication device accesses to the cellular network based on the obtained parameters indicated by the entry of the AIT, which is determined at step 660.

It should be noted that for purposes of simplicity of explanation, the one or more methods shown herein, for example, in the form of a flow chart or flow diagram, are shown and described as a series of steps, it is to be understood and appreciated that the methods are not limited by the order of steps, as some steps may, in accordance therewith, occur in a different order and/or concurrently with other acts from that shown and described herein. More specifically, for example, in FIG. 6, the communication device could first detect the second signature sequence and then wait to detect the first signature sequence. Upon first detecting the second signature sequence, the communication device may discard or store the second signature sequence and wait to detect the first signature sequence to in order to determine a region the communication belongs to. It will be appreciated for the person skilled in the art to implement the alteration, modification and variant of the methods without departing from the spirit and scope of this disclosure.

Figure 7:
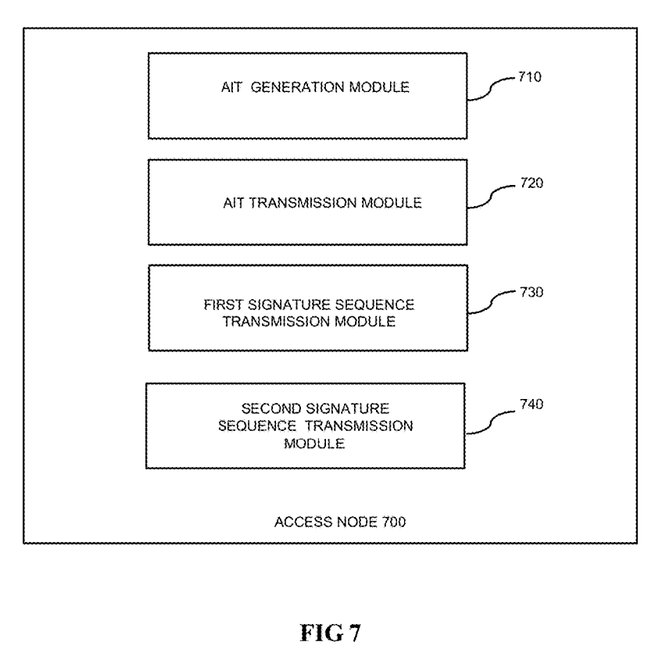
FIG. 7 schematically illustrates a block diagram of an access node according to an embodiment of the disclosure.

FIG. 7 schematically illustrates a block diagram of an access node 700 according to an embodiment of the disclosure. The access node comprises an AIT generation module 710 for generating an AIT and an AIT transmission module 720 for sending the AIT to a plurality of communication devices. Furthermore, the access node comprises a first signature sequence transmission module 730 for sending a first signature sequence and a second signature sequence transmission module 740 for sending a second signature sequence.

It should be mentioned the above modules correspond to the steps of the method described in FIG. 5, and it is appreciated for the person skilled in the art that said modules could be implemented via Programmable Logic Device (PLD), Field Programmable Gate Array (FPGA), Application Specific Integrated Circuit (ASIC), and other implement mechanism as software products, application specific firmware or hardware products.

Figure 8:
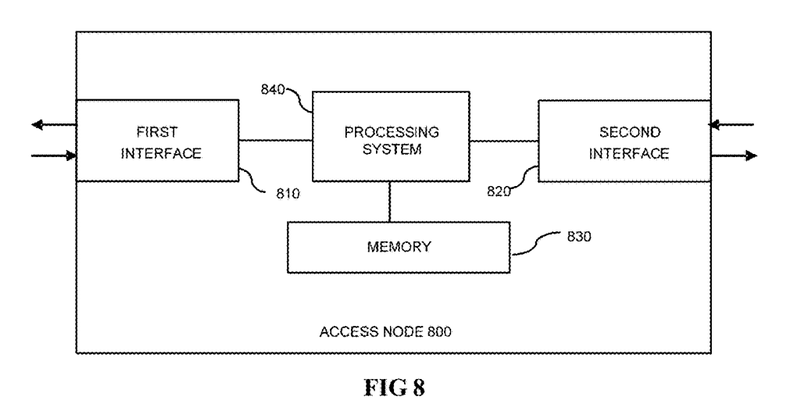
FIG. 8 schematically illustrates another block diagram of an access node according to an embodiment of the disclosure.

FIG. 8 schematically illustrates another block diagram of an access node 800 according to an embodiment of the disclosure. The access node 800 may for example correspond to a BS in a homogeneous network, or a macro-node or a pico-node in a heterogeneous network.

As illustrated, the access node 800 may include a first interface 810 being utilized to interact with communication devices, a second interface 820 being utilized to interact with a core network or other access nodes. Further, the access node may include processing system 840 coupled to the interfaces 810, 820 and a memory 830 storing data and instructions therein. For example, the memory 830 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 830 includes suitably configured program code to be executed by the processing system 840 so as to implement the above-described functionalities of the access node. In particular, the memory 830 may include various program code modules for causing the access node to perform processes as described above, e.g., corresponding to the method steps of FIG. 5.

Figure 9:
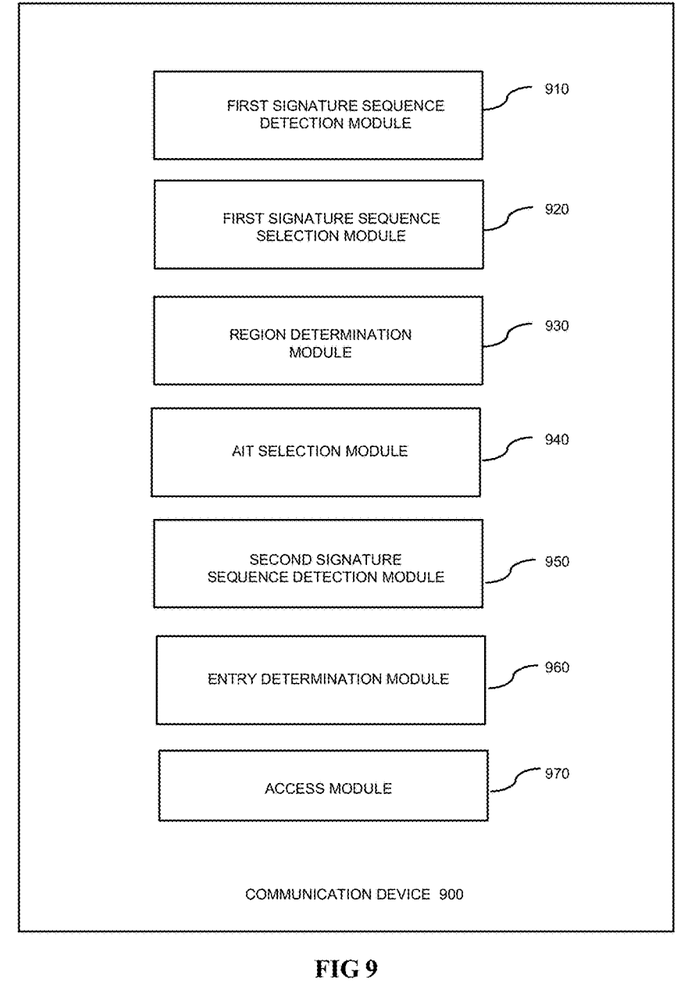
FIG. 9 schematically illustrates a block diagram of a communication device according to an embodiment of the disclosure.

FIG. 9 schematically illustrates a block diagram of a communication device 900 according to an embodiment of the disclosure. The communication device comprises a first signature sequence detection module 910 for detecting one or more of first signature sequences; a first signature sequence selection module 920 for selecting a first signature sequence based on a region selection criterion; a region determination module 930 for determining a region according to the selected first signature sequence; and an AIT selection module 940 for selecting an AIT associated with the determined region from a plurality of AITs, Additionally, the communication device further comprises a second signature sequence detection module 950 for detecting a second signature sequence; an entry determination module 960 for determining an entry of the selected AIT according to the detected second signature sequence; and an access module 970 for accessing the cellular network based on one or more parameters in the entry of the selected AIT.

It should be also mentioned the above modules in FIG. 9 correspond to the steps of the method described in FIG. 6, and it is appreciated for the person skill in the art that said modules could be implemented via Programmable Logic Device (PLD), Field Programmable Gate Array (FPGA), Application Specific Integrated Circuit (ASIC) and other implement mechanism as software products, application specific firmware or hardware products.

Figure 10:
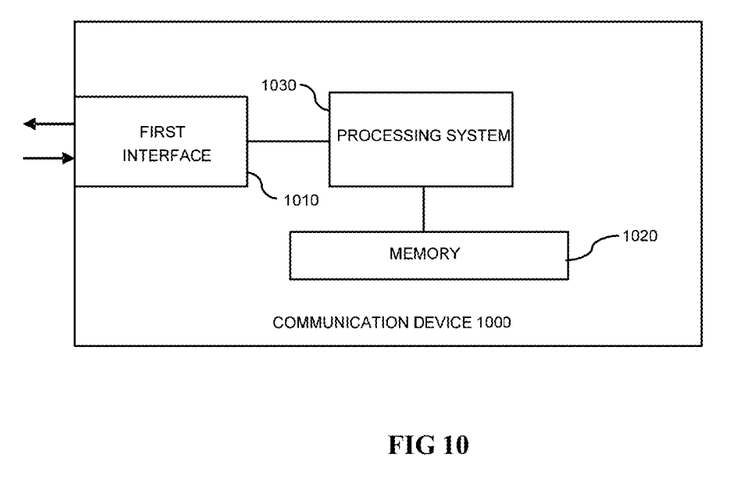
FIG. 10 schematically illustrates another block diagram of communication device according to an embodiment of the disclosure.

FIG. 10 schematically illustrates another block diagram of communication device 1000 according to an embodiment of the disclosure. The communication device may for example correspond to a UE, such as mobile, smart phone, tablet and notebook etc.

As illustrated, the communication device 1000 may include a first interface 1010 for accessing a cellular network, a memory 1020 storing data and instructions therein, and processing system 1030 coupled to the first interface 1010 and the memory 1020. For example, the memory 1020 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 1020 includes suitably configured program code to be executed by the processing system 1030 so as to implement the above-described functionalities of the communication device. In particular, the memory 1020 may include various program code modules for causing the communication device to perform processes as described above, e.g., corresponding to the method steps of FIG. 6.

It should be appreciated that the above concepts may be implemented by using correspondingly designed software to be executed by one or more processors of an existing device, or by using dedicated device hardware. Further, it should be noted that the illustrated nodes or devices may each be implemented as a single node or device or as a system of multiple interacting nodes or devices.

While the embodiments have been illustrated and described herein, it will be understood by those skilled in the art that various changes and modifications may be made, and equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

The invention claimed is:

1. A method for a communication device to access a cellular network, the cellular network comprising a plurality of regions, the method comprising:
   receiving a plurality of information tables (AITs), each associated with a respective region of the plurality of regions;
   detecting one or more of first signature sequences;
   selecting a first signature sequence based on a region selection criterion;
   determining a region of the plurality of regions according to the selected first signature sequence; and
   selecting an AIT associated with the determined region from the plurality of AITs,
      wherein the first signature sequences are associated with a plurality of regions in the cellular network, the selected AIT is identified by the selected first signature sequence, and an AIT comprises a group of entries, each entry of the group indicating one or more parameters for use by the communication device to access the cellular network through an access node associated with the determined region.

2. The method according to claim 1, further comprising:
   detecting a second signature sequence associated with an access node of the cellular network within the region;
   determining an entry of the selected AIT according to the detected second signature sequence; and
   accessing the cellular network through the access node based on one or more parameters in the entry of the selected AIT,
      wherein the second signature sequence is sent by the access node of the cellular network.

3. The method according to claim 1, wherein the parameters for controlling access to the cellular network indicated by the entries of the group in the AIT relate to one or more of random access configuration, paging configuration, handover configuration and/or reselection configuration.

4. The method according to claim 1, wherein the parameters for controlling access to the cellular network indicated by the entries of the group in the AIT relate to one or more of beam-forming configuration, link adaptation configuration and/or Hybrid Automatic Repeat Request configuration.

5. A communication device, comprising:
   a first interface for accessing a cellular network, the cellular network comprising a plurality of regions;
   a memory storing data and instructions therein; and
   a processing system, being configured to:
      receive a plurality of information tables (AITs), each associated with a respective region of the plurality of regions;
      detect one or more of first signature sequences;
      select a first signature sequence based on a region selection criterion;
      determine a region of the plurality of regions according to the selected first signature sequence; and
      select an AIT associated with the determined region from the plurality of AITs,
   wherein the first signature sequences are associated with a plurality of regions in the cellular network, the selected AIT is identified by the selected first signature sequence, and an AIT comprises a group of entries, each entry of the group indicating one or more parameters for use by the communication device to access the cellular network through an access node associated with the determined region.

6. The communication device according to claim 5, the processing system is further configured to:
   detecting a second signature sequence associated with an access node of the cellular network within the region;
   determining. an entry of the selected AIT according to the detected second signature sequence; and
   accessing the cellular network through the access node based on one or more parameters in the entry of the selected AIT,
      wherein the second signature sequence is sent by the access node of the cellular network.

7. The communication device according to claim 5, wherein the parameters for controlling access to the cellular network indicated by the entries of the group in the AIT relate to one or more of random access configuration, paging configuration, handover configuration and/or reselection configuration.

8. The communication device according to claim 5, wherein the parameters for controlling access to the cellular network indicated by the entries of the group in the AIT relate to one or more of beam-forming configuration, link adaptation configuration and/or Hybrid Automatic Repeat Request configuration.

* * * * *